United States Patent
Gigan et al.

(10) Patent No.: US 10,313,018 B2
(45) Date of Patent: Jun. 4, 2019

(54) DIGITAL-DATA MIXING APPARATUS AND DIGITAL-DATA PROCESSING SYSTEM

(71) Applicants: PARIS SCIENCES ET LETTRES—QUARTIER LATIN, Paris (FR); CENTRE NATIONAL DE LA RECHERCHE SCIENTIFIQUE (CNRS), Paris (FR); ECOLE SUPERIEURE DE PHYSIQUE ET DE CHIMIE INDUSTRIELLES DE LA VILLE DE PARIS, Paris (FR); UNIVERSITÉ PARIS DIDEROT—PARIS 7, Paris (FR)

(72) Inventors: Sylvain Gigan, Paris (FR); Florent Krzakala, Antony (FR); Laurent Daudet, Paris (FR); Igor Carron, Paris (FR); Angélique Dremeau, Gahard (FR); Alaa Saade, Paris (FR)

(73) Assignees: PARIS SCIENCES ET LETTRES—QUARTIER LATIN, Paris (FR); CENTRE NATIONAL DE LA RECHERCHE SCIENTIFIQUE (CNRS), Paris (FR); ECOLE SUPERIEURE DE PHYSIQUE ET DE CHIMIE INDUSTRIELLES DE LA VILLE DE PARIS, Paris (FR); UNIVERSITÉ PARIS DIDEROT—PARIS 7, Paris (FR)

( * ) Notice: Subject to any disclaimer, the term of this patent is extended or adjusted under 35 U.S.C. 154(b) by 122 days.

(21) Appl. No.: 15/547,830

(22) PCT Filed: Feb. 4, 2016

(86) PCT No.: PCT/EP2016/052438
§ 371 (c)(1),
(2) Date: Aug. 1, 2017

(87) PCT Pub. No.: WO2016/124716
PCT Pub. Date: Aug. 11, 2016

(65) Prior Publication Data
US 2018/0019822 A1 Jan. 18, 2018

(30) Foreign Application Priority Data
Feb. 4, 2015 (EP) .................................. 15305165

(51) Int. Cl.
*H04B 10/54* (2013.01)
*G06E 3/00* (2006.01)
(Continued)

(52) U.S. Cl.
CPC .......... *H04B 10/541* (2013.01); *G06E 3/005* (2013.01); *H04B 10/40* (2013.01); *H04B 10/61* (2013.01); *H04B 10/801* (2013.01)

(58) Field of Classification Search
CPC ...... H04B 10/541; H04B 10/40; H04B 10/61; H04B 10/801; G06E 3/005
(Continued)

(56) References Cited

U.S. PATENT DOCUMENTS

| 5,621,752 A * | 4/1997 | Antonio ............... H04B 1/7085 370/335 |
| 2010/0172651 A1* | 7/2010 | Nien .................. H04B 10/1141 398/135 |
| 2018/0367192 A1* | 12/2018 | O'Shea ............... H04B 7/0452 |

OTHER PUBLICATIONS

International Search Report issued in corresponding application No. PCT/EP2016/052438 dated Apr. 29, 2016 (2 pages).
(Continued)

*Primary Examiner* — Dalzid E Singh
(74) *Attorney, Agent, or Firm* — Osha Liang LLP

(57) ABSTRACT

The invention is related to a digital-data mixing apparatus (2), a data processing system (1) and an associated method for mixing digital-data. The digital-data mixing apparatus comprises, integrated in a housing (7), input means (8) for receiving a plurality of bits (I1 . . . In) of input digital data
(Continued)

(4), electromagnetic emission means (9) for generating a modulated electromagnetic beam (15) wherein said input digital data (4) are converted in simultaneous modulations of the modulated electromagnetic beam (15), electromagnetic scattering means (10) for scattering the modulated electromagnetic beam (15) in a scattered electromagnetic beam (19), receiving means (11) for converting the scattered electromagnetic beam (19) in bits (O1 . . . Om) of output digital data (5), and output means (12) for providing said output digital data (5).

20 Claims, 3 Drawing Sheets

(51) Int. Cl.
    *H04B 10/61* (2013.01)
    *H04B 10/80* (2013.01)
    *H04B 10/40* (2013.01)

(58) Field of Classification Search
    USPC ........................................................ 398/135
    See application file for complete search history.

(56) References Cited

OTHER PUBLICATIONS

Written Opinion of the International Searching Authority issued in corresponding application No. PCT/EP2016/052438 dated Apr. 29, 2016 (7 pages).

V. Durán et al., "Computational imaging with single-pixel detection: applications in scattering media"; Proceedings of the 13th Workshop on Information Optics (WIO'14); XP032665465; Jul. 7, 2014 (3 pages).

A. Liutkus et al., "Imaging with Nature: A Universal Analog Compressive Imager Using a Multiply Scattering Medium"; ARXIV:1309.0425V1; XP055194020; Sep. 2, 2013 (15 pages).

D. B. Conkey et al., "High-speed, phase-control of wavefronts with binary amplitude DMD for light control through dynamic turbid media"; Proceedings of the SPIE; vol. 8617, 86170; XP055267116; Mar. 5, 2013 (6 pages).

D. Akbulut et al., "Focusing light through random photonic media by binary amplitude modulation"; Optics Express, vol. 19, No. 5, pp. 4017-4029; XP055267135; Feb. 15, 2011 (13 pages).

\* cited by examiner

DIGITAL-DATA MIXING APPARATUS AND DIGITAL-DATA PROCESSING SYSTEM

FIELD OF THE INVENTION

The invention relates to the field of data processing. More particularly, the invention relates to a digital-data mixing apparatus, a digital-data processing system and a method for mixing digital-data.

BACKGROUND OF THE INVENTION

The advent of the digital age, and the advances in information and communications technologies have made it exponentially cheaper and faster to collect, create, share, process and store information.

This, in turn, has resulted in a data explosion which is now commonly referred to as "big data" and which means in practice that many public and private structures now host very large databases of digital information.

These very large databases pose several challenges when one tries to analyze them, understand them and extract useful features from them. A first challenge is the computational cost of processing such large amounts of data, and it is now estimated that the energy consumed by data centers hosting and processing such databases has become a non-negligible fraction of the total energy consumption in western countries. Another challenge is the scaling issue of the algorithms that process these data which has led to a revival of the machine learning subfield of computer science, being now extremely active.

In recent years, a promising way to reduce the computational cost and scale of these tasks has been identified which consists in applying randomization algorithms to the initial data as part of a data pre-processing, thereby obtaining a smaller set of data on which less costly processing algorithms can implemented. A randomization algorithm typically computes a number of random projections of the initial data, also called "random features", by randomly mixing the initial data together, therefore keeping, in a smaller dataset, a large amount of useful information contained in the initial data.

However, the computing of random projections usually involves the determination of very large random matrices and the computation of matrix-products between these random matrices and the input data. These steps still require a large amount of processing power and memory and are thus bottlenecks for the use of randomization algorithms in data pre-processing.

Moreover, as an alternative to random projections, random embeddings, mapping the data to a much larger dimensional space, have been shown to allow an improvement in classifying complex data. Examples include Extreme Learning Machines (ELM) which are considered a competitive alternative to convolutional neural networks. Here again, the computing of such a mapping to a larger dimensional space requires a large amount of processing power and memory and is a bottleneck for the use of such data pre-processing for improved classification.

There is thus a need for an apparatus and a method that would provide a mixing of digital data without the aforementioned drawbacks.

SUMMARY OF THE INVENTION

To this aim, according to the invention, it is provided a method for mixing digital-data comprising at least the steps of:

receiving a plurality of at least n bits of input digital data,
generating a modulated electromagnetic beam wherein said n bits of input digital data are converted in p simultaneous modulations of the modulated electromagnetic beam,
scattering the modulated electromagnetic beam comprising said p simultaneous modulations, in a scattered electromagnetic beam,
converting said scattered electromagnetic beam in at least one bit of output digital data,
providing said at least one bit of output digital data.

With these features, it is possible to mix digital data, i.e. compute random projections of the initial data with a minimal processing power since an important part of the data processing is performed in an analog manner, by physical scattering of an electromagnetic beam.

In some embodiments, one might also use one or more of the following features:

the modulated electromagnetic beam is a beam of coherent electromagnetic radiation;

said p simultaneous modulations of the modulated electromagnetic beam comprise a modulation of at least one of an amplitude, an intensity, a phase and a polarization of the modulated electromagnetic beam, with regards to a reference amplitude, intensity, phase or polarization of the modulated electromagnetic beam;

generating a modulated electromagnetic beam comprises: generating an initial electromagnetic beam by means of an electromagnetic beam source, receiving the plurality of at least n bits of input digital data and the initial electromagnetic beam by means of an electromagnetic beam modulator, and applying p simultaneous modulations to the initial electromagnetic beam in order to obtain the modulated electromagnetic beam by means of said electromagnetic beam modulator;

said p simultaneous modulations of the modulated electromagnetic beam are respectively associated with p distinct transverse locations on a wavefront of the modulated electromagnetic beam and/or the initial electromagnetic beam;

said p simultaneous modulations of the modulated electromagnetic beam are respectively associated with p distinct wave vectors of the modulated electromagnetic beam and/or the initial electromagnetic beam;

scattering the modulated electromagnetic beam is performed by passive scattering means;

scattering the modulated electromagnetic beam is performed by transmission scattering means and comprises: receiving the modulated electromagnetic beam by means of an entry face of said transmission scattering means, performing multiple electromagnetic scattering by means of a scattering body of said transmission scattering means separating said entry face from an exit face of said transmission scattering means, and transmitting the scattered electromagnetic beam by means of said exit face of said transmission scattering means;

the receiving means is able to simultaneously convert the scattered electromagnetic beam in a plurality of m bits of output digital data, in particular m bits of output digital data associated to q distinct locations of a sensor area of the receiving mean.

The invention also relates to a digital-data mixing apparatus, in particular for a data processing system, able to receive input digital data and to provide output digital data, the apparatus comprising, integrated in a housing:

input means for receiving a plurality of at least n bits of input digital data, electromagnetic emission means for generating a modulated electromagnetic beam wherein said n bits of input digital data are converted in p simultaneous modulations of the modulated electromagnetic beam, electromagnetic scattering means for scattering the modulated electromagnetic beam comprising said p simultaneous modulations, in a scattered electromagnetic beam, receiving means for converting said scattered electromagnetic beam in at least one bit of output digital data, and output means for providing said at least one bit of output digital data, the apparatus further comprising a plurality of conductive terminals (13, 24) for receiving the input digital data (4) and providing the output digital data (5), the apparatus (2) being able to be fixed and electrically connected to a printed circuit board.

In some embodiments, one might also use one or more of the following features:

the modulated electromagnetic beam is a beam of coherent electromagnetic radiation;

said p simultaneous modulations of the modulated electromagnetic beam comprise a modulation of at least one of an amplitude, an intensity, a phase and a polarization of the modulated electromagnetic beam, with regards to a reference amplitude, intensity, phase or polarization of the modulated electromagnetic beam;

the electromagnetic emission means comprises: an electromagnetic beam source for generating an initial electromagnetic beam, and an electromagnetic beam modulator for receiving the plurality of at least n bits of input digital data and the initial electromagnetic beam, and for applying p simultaneous modulations to the initial electromagnetic beam in order to obtain the modulated electromagnetic beam;

the electromagnetic beam modulator is a spatial light modulator, in particular a spatial light modulator comprising micro-mirrors or liquid crystals, and the electromagnetic beam source comprises a laser;

said p simultaneous modulations of the modulated electromagnetic beam are respectively associated with p distinct transverse locations on a wavefront of the modulated electromagnetic beam and/or the initial electromagnetic beam;

said p simultaneous modulations of the modulated electromagnetic beam are respectively associated with p distinct wave vectors of the modulated electromagnetic beam and/or the initial electromagnetic beam;

the electromagnetic scattering means is a passive scattering means;

the electromagnetic scattering means is a transmission scattering means comprising an entry face receiving the modulated electromagnetic beam and an exit face transmitting the scattered electromagnetic beam, said entry face and exit face being separated by a scattering body able to perform multiple electromagnetic scattering;

the electromagnetic scattering means remains stable over time, in particular stable over a period of time of at least two minutes, preferably two days, more preferably two months;

the receiving means is able to simultaneously convert the scattered electromagnetic beam in a plurality of m bits of output digital data, in particular m bits of output digital data associated to q distinct locations of a sensor area of the receiving means;

the receiving means comprises an image sensor.

The invention also relates to a digital-data processing system comprising a digital-data mixing apparatus as detailed here above, and at least one separate electronic component for providing the input digital data to the digital-data mixing apparatus and receiving the output digital data from the digital-data mixing apparatus.

In some embodiments, the digital-data processing system may comprise at least a first digital-data mixing apparatus and a second digital-data mixing apparatus as detailed above, said first digital-data mixing apparatus and second digital-data mixing apparatus being connected together, directly or through interconnection electronic components, so that the input digital data of the second digital-data mixing apparatus are based on the output digital data from the first digital-data mixing apparatus.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION

Figure 1:
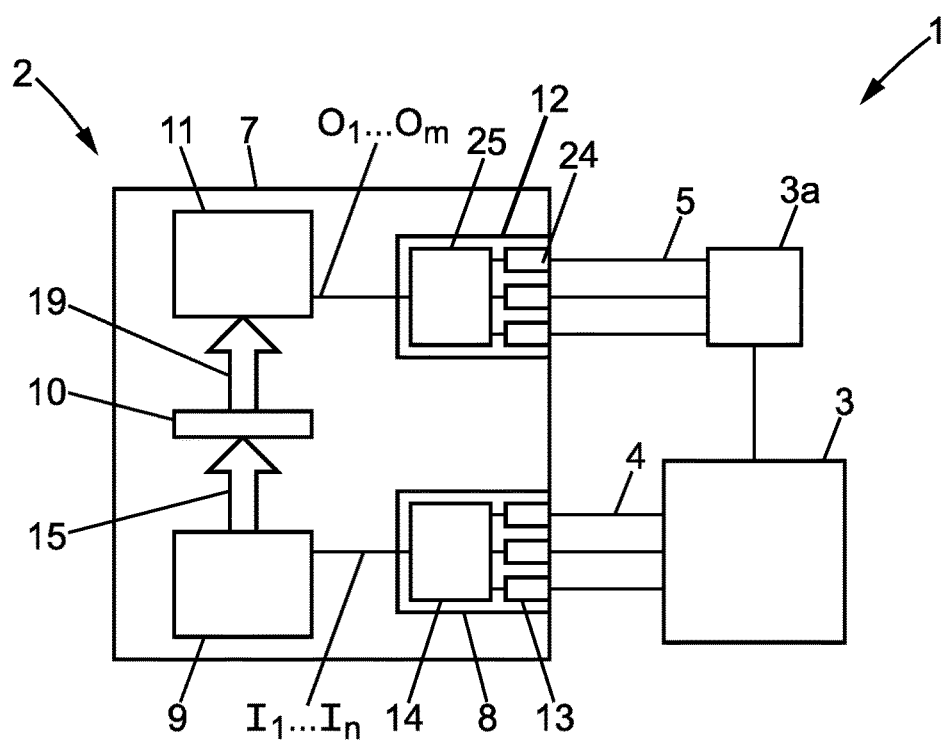
FIG. 1 is a block diagram of a digital-data processing system according to an embodiment of the invention.

A reference is first made to FIG. 1 which illustrates a digital-data processing system 1 according to an embodiment of the invention.

This digital-data processing system 1 is able to process digital-data and, in particular, is able to process a large quantity of digital data as mentioned before.

For instance, the digital-data processing system 1 may implement methods of statistical Machine Learning as known in the art (in particular for classification or regression, such as deep neural networks or Randomized Kernel Machines for instance). The digital-data processing system 1 may also implement methods for deterministic or randomized numerical linear algebra (for instance in the field of Large Scale scientific computations involving matrix and tensor randomization). In a general way, digital-data processing system 1 may find use in any digital data processing involving but not limited to one of a Stochastic Gradient Descent solver, a Large Scale Random kernel, an Extreme Learning Machine, a Randomized Numerical Linear Algebra algorithm, a Locally Sensitive Hashing, an iterative eigensolver and/or a Database friendly random projection.

As illustrated on FIG. 1, the digital-data processing system 1 comprises a digital-data mixing apparatus 2 and at least one separate electronic component 3.

The digital-data mixing apparatus 2 will be presented in greater details hereafter and is generally able to receive input digital data 4 and to provide output digital data 5 that are function of the input digital data 4, in particular through an analog-mixing process involving the scattering of electromagnetic waves.

The electronic component 3 provides input digital data 4 to the digital-data mixing apparatus 2 and receives output digital data 5 from the digital-data mixing apparatus 2. The electronic component 3 is referred in the description as a single component but may comprise a plurality of distinct electronic components 3. The electronic component 3 can for instance be, or comprise, a processing unit such as a central processing unit (CPU), a graphic processing unit (GPU) and/or any type of such processing unit known in the art.

The digital-data mixing apparatus 2 and the electronic component 3 are connected together, directly or through interconnection electronic components 3a. For instance, the electronic component 3, and/or the digital-data mixing apparatus 2, may be electrically connected and fixed to a printed circuit board of a computer or server, said printed circuit board performing an electrical and physical connection between the electronic component 3 and the digital-data mixing apparatus 2. In another embodiment, the digital-data mixing apparatus 2 may not be physically fixed to the electronic component 3 and may be for instance a separate entity electrically connected to the electronic component 3 by connection cables. In one embodiment, the digital-data mixing apparatus 2 may thus be a stand-alone module connected to a computer by a connection cable, said digital-data mixing apparatus and said computer together forming the digital-data processing system 1.

An embodiment of a digital-data mixing apparatus 2 according to the invention is illustrated in greater details on FIG. 1. It comprises a housing 7 in which are integrated input means 8, electromagnetic emission means 9, electromagnetic scattering means 10, receiving means 11 and output means 12. The input means 8 is able to receive input digital data 4, in particular able to receive a plurality of at least n bits $I_1 \ldots I_n$ of input digital data 4. The input means 8 comprises for instance a plurality of conductive terminals 13. The input means 8 may also comprises a digital input circuit 14 connected to the conductive terminals 13. Conductive terminals 13 may be accessed from the outside of the housing 7 and may for instance extend toward the outside of the housing 7, from a face of the housing 7. When the digital-data mixing apparatus 2 is integrated in a digital-data processing system 1 with a separate electronic component 3, the conductive terminals 13 are electrically connected to the electronic component 3 as detailed here before, directly or through interconnection electronic components 3a.

In one embodiment, the apparatus 2 is thus able to be electrically connected to a printed circuit board, in particular fixed and electrically connected to the printed circuit board by using conductive terminals 13 or electrically connected to the printed circuit board by connection cables connected to the conductive terminals 13.

The digital input circuit 14 of the input means 8 may be designed to perform a pre-processing of the input digital data 4, for instance to prepare the digital data for the subsequent analog processing, thereby obtaining the n bits $I_1 \ldots I_n$ of input digital data 4. The n bits $I_1 \ldots I_n$ of input digital data 4 are transmitted by the input means 8 to the electromagnetic emission means 9.

The electromagnetic emission means 9 is able to generate a modulated electromagnetic beam 15 wherein said n bits $I_1 \ldots I_n$ of input digital data 4 are converted in p associated simultaneous modulations $M_1 \ldots M_p$ of the modulated electromagnetic beam 15.

The p simultaneous modulations $M_1 \ldots M_p$ of the modulated electromagnetic beam 15 may be modulations of the amplitude, the intensity, the phase and/or the polarization of the modulated electromagnetic beam 15. Advantageously, these modulations $M_1 \ldots M_p$ are modulation of the intensity of the modulated electromagnetic beam 15, or of the intensity and the phase of the modulated electromagnetic beam 15. These modulations $M_1 \ldots M_p$ may be understood as modulation of said physical properties with regards to reference physical properties of the modulated electromagnetic beam 15, i.e. reference amplitude, intensity, phase and/or polarization of the modulated electromagnetic beam 15.

By "simultaneous", in "p simultaneous modulations of the modulated electromagnetic beam", it is meant that during a period of time, hereafter referred to as a "mixing period of time", the p modulations are all applied together to the modulated electromagnetic beam 15. The duration of this mixing period of time is advantageously longer than an acquisition time of the receiving means 11, for instance longer than a picosecond, in particular longer than a nanosecond. In an embodiment in which the receiving means 11 comprises an image sensor, the mixing period of time may be of the order of a microsecond of a millisecond. The mixing period of time may be shorter than a second for processing data with a high frequency.

The number p of simultaneous modulations $M_1 \ldots M_p$ of the modulated electromagnetic beam 15 may be equal to the number n of bits $I_1 \ldots I_n$ of input digital data 4 but may also be smaller or higher.

In particular, the modulations $M_1 \ldots M_p$ of the modulated electromagnetic beam 15 may be selected between more than two different physical states and thus encode more than just a binary value of input digital data 4. For instance, the phase of the modulated electromagnetic beam 15 may be modulated with a predefined accuracy to encode several bits of input digital data in a single modulation of the phase. As a non-limitative example, the phase of the modulated electromagnetic beam 15 may be modulated with an accuracy of about 1 degree thereby allowing encoding about eight bits of input digital data in a single modulation of the phase of the modulated electromagnetic beam 15.

In one embodiment of the invention, the electromagnetic emission means 9 generates a modulated electromagnetic beam 15 having a major wavelength in the visible or infrared part of the electromagnetic spectrum.

The housing 7 of the digital-data mixing apparatus 2 is advantageously opaque at the wavelength of the major wavelength of the modulated electromagnetic beam 15. In some embodiment of the invention, at least the electromagnetic emission means 9, the electromagnetic scattering means 10 and the receiving means 11 are enclosed in an enclosure inside the housing 7, said enclosure being opaque at the wavelength of the major wavelength of the modulated electromagnetic beam 15.

The housing 7 is rigid and can be made in any suitable material, in particular plastic, metal, polymer, glass or the like. In some embodiment of the invention, the housing 7 may be opened, for instance to gain access to the electromagnetic scattering means 10 for removing and/or changing the electromagnetic scattering means 10. In other embodiments, the housing 7 is sealed and cannot be open without destroying its integrity.

Figure 2:
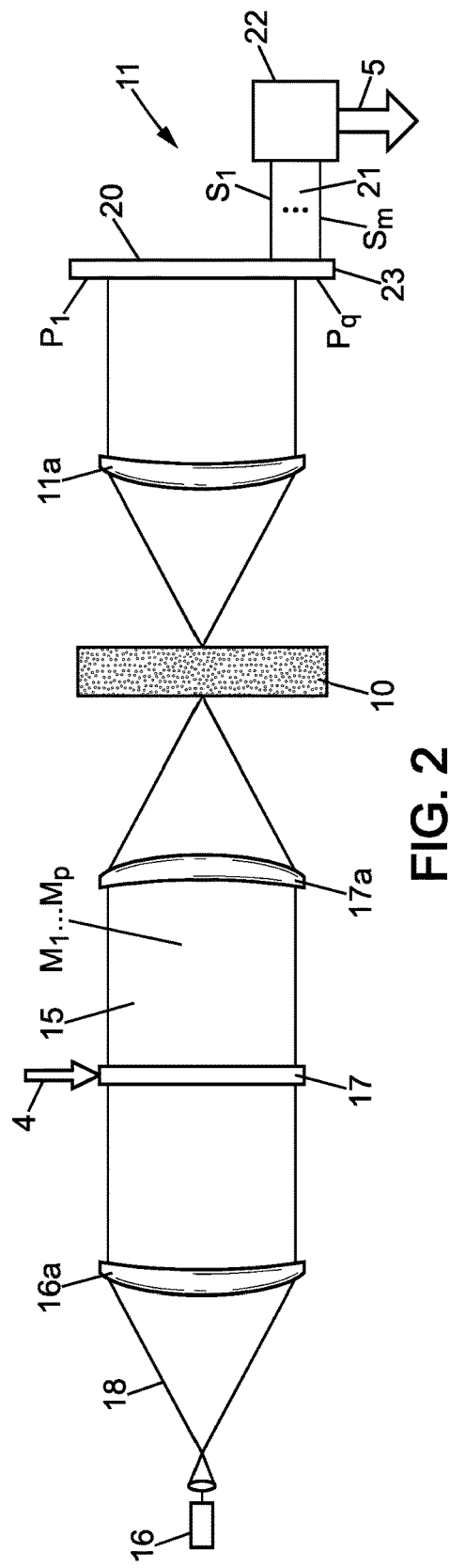
FIG. 2 is a block diagram of a digital-data mixing apparatus according to an embodiment of the invention.

FIG. 2 illustrate in greater details an embodiment of the electromagnetic emission means 9 according to the invention. In this embodiment, the electromagnetic emission means 9 comprises an electromagnetic beam source 16 and an electromagnetic beam modulator 17.

The electromagnetic beam source 16 generates an initial electromagnetic beam 18. The electromagnetic beam source 16 may for instance generates an initial electromagnetic beam 18 having a major wavelength in the visible or infrared part of the electromagnetic spectrum.

The electromagnetic beam source 16 is a source of coherent electromagnetic radiation, or at least partially coherent electromagnetic radiation. For instance, is may comprises a laser or a superluminescent diode. The electromagnetic beam source 16 may also comprise optical devices 16a to shape the initial electromagnetic beam 18, such as collimating lenses, beam expanders, mirrors and the like.

The electromagnetic beam modulator 17 is able to receive the n bits $I_1 \ldots I_n$ of input digital data 4, for instance at a digital input of the electromagnetic beam modulator 17. It is also able to receive the initial electromagnetic beam 18 from the electromagnetic beam source 16. The electromagnetic beam modulator 17 is then able to apply p simultaneous modulations $M_1 \ldots M_p$ to the initial electromagnetic beam 18, associated to the n bits $I_1 \ldots I_n$ of input digital data 4, in order to obtain the modulated electromagnetic beam 15.

The electromagnetic beam modulator 17 can be, for instance an electrically addressed beam modulator. In the embodiment where the electromagnetic beam source 16 generates an initial electromagnetic beam 18 having the major wavelength in the visible or infrared part of the electromagnetic spectrum, the electromagnetic beam modulator 17 can be a spatial light modulator, in particular an electrically addressed spatial light modulator (EASLM). In the embodiment illustrated on FIG. 2, the electromagnetic beam modulator 17 is a spatial light modulator comprising a plurality of independently addressable micro-mirrors. The electromagnetic beam modulator 17 thus performs a controlled reflection of the initial electromagnetic beam 18 and the p simultaneous modulations $M_1 \ldots M_p$ are associated to p controlled orientation of p micro-mirrors. Alternatively, the electromagnetic beam modulator 17 may be a spatial light modulator comprising a plurality of independently addressable liquid crystals. The electromagnetic beam modulator 17 may thus performs a controlled transmission of the initial electromagnetic beam 18 and the p simultaneous modulations $M_1 \ldots M_p$ may then be associated to p controlled states of p liquid crystals.

In another embodiment of the invention, the electromagnetic emission means 9 may comprise an electromagnetic beam source 16 that is able to generate directly a modulated electromagnetic beam 15 having p simultaneous modulations $M_1 \ldots M_p$. In this embodiment, the electromagnetic emission means 9 may for instance comprise a set of coherently synchronized lasers.

Advantageously, the modulated electromagnetic beam 15 is a beam of coherent electromagnetic radiation, or at least partially coherent electromagnetic radiation. This way, the scattering of the modulated electromagnetic beam 15 by the electromagnetic scattering means 10 results in interferences from multiple path of light and lead to a high number of degrees of freedom and thus a high mixing of the input data 4.

Figure 3:
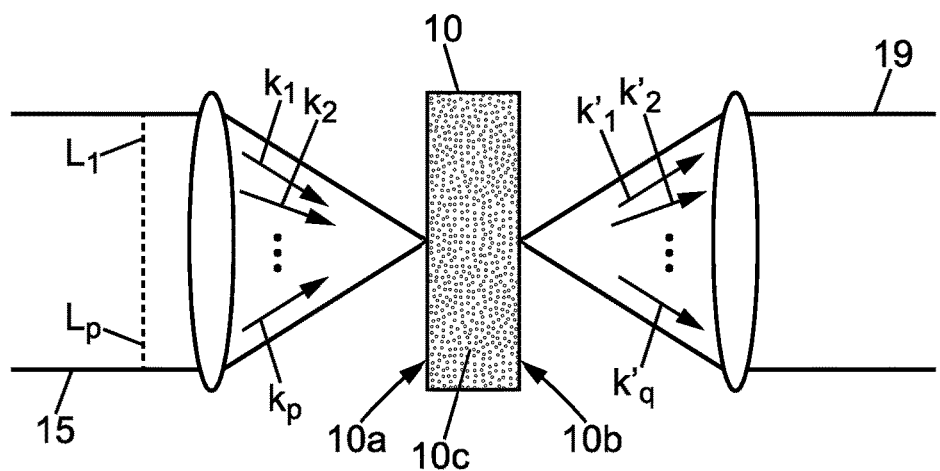
FIG. 3 illustrate in greater details the electromagnetic scattering means of the digital-data mixing apparatus of FIG. 2.

In one example of the invention, the p modulations $M_1 \ldots M_p$ of the modulated electromagnetic beam 15 are respectively associated with p distinct transverse locations $L_1 \ldots L_p$ on a wavefront of the modulated electromagnetic beam 15 and/or the initial electromagnetic beam 18 as illustrated on FIG. 3. The p distinct transverse locations $L_1 \ldots L_p$ may be p independently addressable micro-mirrors associated to the p simultaneous modulations $M_1 \ldots M_p$, or the location of p liquid crystals associated to the p simultaneous modulations $M_1 \ldots M_p$.

The p simultaneous modulations $M_1 \ldots M_p$ of the modulated electromagnetic beam 15 may also be respectively associated with p distinct wave vectors $k_1 \ldots k_p$ of the modulated electromagnetic beam 15 and/or the initial electromagnetic beam 18.

It is to be noted that the p distinct wave vectors $k_1 \ldots k_p$ of the modulated electromagnetic beam 15 associated to said modulations $M_1 \ldots M_p$ may also correspond p distinct transverse locations $L_1 \ldots L_p$ on the wavefront of the modulated electromagnetic beam 15 and/or the initial electromagnetic beam 18 as illustrated on FIG. 3. Indeed, an optical device 17a of the electromagnetic beam modulator 17 may shape the modulated electromagnetic beam 15. The optical device 17a may comprise a lens converting transverse locations $L_1 \ldots L_p$ on the wavefront of the modulated electromagnetic beam 15 in wave vectors $k_1 \ldots k_p$ of the modulated electromagnetic beam 15 or vice-et-versa.

FIG. 3 illustrates in greater details electromagnetic scattering means 10 according to an embodiment of the invention. The electromagnetic scattering means 10 is able to scatter the modulated electromagnetic beam 15 comprising said p simultaneous modulations $M_1 \ldots M_p$, in a scattered electromagnetic beam 19.

Advantageously, the electromagnetic scattering means 10 can be a transmission scattering means. The electromagnetic scattering means 10 may thus comprise an entry face 10a, an exit face 10b, and a scattering body 10c separating the entry face 10a and the exit face 10b. The entry face 10a receives the modulated electromagnetic beam 15 and the exit face 10b transmits the scattered electromagnetic beam 19. The scattering body 10c is able to perform multiple electromagnetic scattering of the modulated electromagnetic beam 15 to obtain the scattered electromagnetic beam 19. This disposition gives an optimum multiple scattering of the modulated electromagnetic beam 15.

The electromagnetic scattering means 10 can in particular be, or comprise, a multiple scattering medium, for instance housed in, or forming, the scattering body 10c.

By "scattering", it is meant a process and a medium in which electromagnetic radiations that compose an electromagnetic beam are forced to elastically deviate from straight trajectories by non-uniformities in a medium. By "multiple scattering" it is thus meant a process and a medium in which the radiations that enter the medium are scattered several times before exiting the medium. Given the sensitivity of the scattering to the nature and location of non-uniformities in the medium, it is very difficult, or almost impossible, to predict the precise output of such a process and a medium which thus perform a random scattering of the electromagnetic beam.

Since the modulated electromagnetic beam 15 carries p simultaneous modulations $M_1 \ldots M_p$, a multiple scattering of the modulated electromagnetic beam 15 can amount to an analog mixing of the p simultaneous modulations $M_1 \ldots M_p$. Moreover, since the p simultaneous modulations $M_1 \ldots M_p$ are associated to n bits $I_1 \ldots I_n$ of input digital data 4, the digital-data mixing apparatus 2 thus perform a random analog mixing of the n bits $I_1 \ldots I_n$ of digital input data 4.

Generally speaking, the electromagnetic scattering means 10 is thus able to convert the p simultaneous modulations $M_1 \ldots M_p$ of the modulated electromagnetic beam 15 in simultaneous modulations of the scattered electromagnetic beam 19.

By "modulations of the scattered electromagnetic beam", it is meant modulation of the scattered electromagnetic beam with regard to a reference scattered beam corresponding to the scattering of an unmodulated input electromagnetic beam 15 which doesn't carrying said p simultaneous modulations $M_1 \ldots M_p$.

In a similar way to what was discussed previously regarding the modulated electromagnetic beam 15, the simultaneous modulations of the scattered electromagnetic beam 19 may be associated with distinct transverse locations $L'_1 \ldots L'_q$ on a wavefront and/or distinct wave vectors of the scattered electromagnetic beam 19, for instance q distinct transverse locations $L'_1 \ldots L'_q$ on a wavefront of the scattered electromagnetic beam 19 and/or q distinct wave vectors $k'_1 \ldots k'_q$ of the scattered electromagnetic beam 19.

Examples of multiple scattering medium suitable for the invention are translucent materials, amorphous materials such as paint pigments, amorphous layers deposited on glass, scattering impurities embedded in transparent matrices, nano-patterned materials and polymers. An example of such a multiple scattering medium is a layer of an amorphous material such as a layer of Zinc-oxide (ZnO) on a substrate.

These multiple scattering medium perform a very complex yet deterministic scattering of the electromagnetic beam, than can be considered a random scattering process.

Advantageously, the electromagnetic scattering means 10 is a passive scattering mean. By "passive", it is meant that they don't need to be powered by an external power supply to perform the scattering of the beam.

In one embodiment of the invention, the electromagnetic scattering means 10 is a linear scattering means, meaning that there have negligible non-linear effects on the modulated electromagnetic beam 15.

By "non-linear effects", it is understood for instance a doubling or a change in the frequency of said radiation.

In another embodiment, the electromagnetic scattering means 10 may have non-negligible non-linear scattering effects on the modulated electromagnetic beam 15. This latter embodiment is of particular interest in a chained digital-data mixing apparatus 2, i.e. in a first digital-data mixing apparatus 2 which is comprised in a digital-data processing system 1 with a first and a second digital-data mixing apparatus 2, in particular when the input digital data 4 of a second digital-data mixing apparatus 2 are function of the output digital data 5 of the said digital-data mixing apparatus 2. These embodiments of the digital-data processing system 1 will be further detailed hereafter.

Advantageously, the electromagnetic scattering means 10 may remain stable over time. This way, the scattering properties of the electromagnetic scattering means 10 can be calibrated and will remain unchanged for a period of time. For instance, said period of time may be at least two minutes, preferably two days, more preferably two months.

By "its scattering properties remain unchanged for a period of time", it is understood that the scattering properties of the electromagnetic scattering means 10 remain within a predefined detection accuracy range on said period of time.

To check whether the scattering properties of the electromagnetic scattering means 10 remain unchanged, a procedure for qualifying the output of the data mixing apparatus may be put in place.

Such a procedure may consists for instance in supplying a library of known signals as digital input data to the data mixing apparatus and saving the output digital data in a database of output data. This database of output data thereby constitutes a signature of the data mixing apparatus. Stability and consistency of the data mixing apparatus may thus be checked by comparing said signatures at different points in time and/or across data mixing apparatus.

The receiving means 11 of the data mixing apparatus 2 is able to receive the scattered electromagnetic beam 19 and to convert the scattered electromagnetic beam 19 in at least one bit $O_1$ of output digital data 5. The receiving means 11 thus comprises at least one electromagnetic transducer to convert the scattered electromagnetic beam 19 in an electric acquisition signal 21.

In one embodiment of the invention, illustrated on FIG. 2, the receiving means 11 is able to simultaneously convert the scattered electromagnetic beam 19 in a plurality of m bits $O_1 \ldots O_m$ of output digital data 5.

By "simultaneously", in "simultaneously convert the scattered electromagnetic beam in a plurality of bits of output digital data", it is understood that the scattered electromagnetic beam 19 is converted in a plurality of m bits of output digital data during the mixing period of time where the p modulations are all applied together to the modulated electromagnetic beam 15. As mentioned before, the duration of the mixing period of time is thus advantageously longer than an acquisition time of the receiving means 11, for instance longer than a picosecond, in particular longer than a nanosecond. In an embodiment in which the receiving means 11 comprises an image sensor, the mixing period of time may be of the order of a microsecond of a millisecond. The mixing period of time may be shorter than a second for processing data with a high frequency.

In one embodiment of the invention, said m bits $O_1 \ldots O_m$ of output digital data 5 are associated to q distinct locations $P_1 \ldots P_q$ of a sensor area 23 of the receiving means 11.

The number m of bits $O_1 \ldots O_m$ of output digital data 5 may be equal to the number q of distinct locations $P_1 \ldots P_q$ of the sensor area 23 but may also be smaller or higher.

In particular, since the modulations the modulated electromagnetic beam 15 may be selected between more than two different physical states, they may thus encode more than just a binary value of input digital data 4 as detailed before. For instance, the phase of the scattered electromagnetic beam 19 may thus be converted with a predefined accuracy thereby encoding several bits of output digital data in a single modulation of the phase. As detailed above in a non-limitative example, the phase of the scattered electromagnetic beam 19 may be converted with an accuracy of about 1 degree thereby allowing encoding about eight bits of output digital data in a single modulation of the phase of the scattered electromagnetic beam 19. In some embodiment, the phase of the scattered electromagnetic beam 19 may be converted with an accuracy different from the accuracy used to modulate the modulated electromagnetic beam 15.

Consequently, the number m of bits $O_1 \ldots O_m$ of output digital data 5 may be equal to the number n of bits $I_1 \ldots I_n$ of input digital data 4, but may also be smaller (compression of information, i.e. projecting on a smaller dimensional space) or higher (projecting on a larger dimensional space).

In the embodiment of the invention illustrated on FIG. 2, the receiving means 11 comprises an image sensor 20 generating an acquisition signal 21 that is function of the scattered electromagnetic beam 19. The acquisition signal 21 may comprise m sub-signals $S_1 \ldots S_m$, for instance respectively associated to m distinct locations $P_1 \ldots P_m$ of said sensor area 23 of the receiving means 11.

Such an image sensor 20 is in particular an electromagnetic detector array. The image sensor 20 may be an analog device, for instance a charge-coupled device (CCD), or an active pixel sensor, for instance a device based on a complementary metal-oxide-semiconductor (CMOS).

The receiving means 11 may further comprises a post-processing circuit 22, able to perform a post-processing of the receiving signal 21 to obtain the m bits of output digital data 5. The post-processing circuit 22 may for instance perform an analog-digital conversion of the acquisition signal 21, in particular an analog-digital conversion of the m sub-signals $S_1 \ldots S_m$ of the acquisition signal 21.

The receiving means 11 may apply another non-linear processing to the m bits of output digital data 5, for instance by converting only the intensity of the scattered electromagnetic beam 19, or by means of a non-linear processing applied by the post-processing circuit 22.

In the embodiment of FIG. 2, the receiving means 11 further comprises optical devices 11a to shape the scattered electromagnetic beam 19 before its conversion, for instance in order to convert wave vectors $k'_1 \ldots k'_m$ of the scattered electromagnetic beam 19 in transverse locations on the wavefront of the scattered electromagnetic beam 19 that may be associated to distinct locations $P_1 \ldots P_m$ of the sensor area 23 of the receiving means 11.

The output means 12 of the digital-data mixing apparatus 2 is able to provide at least one bit $O_1$ of output digital data 5. The output means 12 is in particular able to provide said at least one bit $O_1$ of output digital data 5 to an electronic component 3 of a digital-data processing system 1 comprising the digital-data mixing apparatus 2 as illustrated on FIG. 1.

Similarly to the input means 8, the output means 12 may comprise a plurality of conductive terminals 24. The conductive terminals 24 may be the same than the conductive terminals 13 of the input means 8, the data input and output being then advantageously multiplexed in time. The output means 12 may also comprises a digital output circuit 25 connected to the conductive terminals 24. Conductive terminals 24 may be accessed from the outside of the housing 7 and may for instance extend toward the outside of the housing 7, from a face of the housing 7. When the digital-data mixing apparatus 2 is integrated in a digital-data processing system 1 with a separate electronic component 3, the conductive terminals 24 are electrically connected to the electronic component 3 as detailed here before, directly or through interconnection electronic components 3a.

In one embodiment, the apparatus 2 is thus able to be electrically connected to a printed circuit board, in particular electrically connected to the printed circuit board by further using conductive terminals 24 and/or connection cables connected to the conductive terminals 13.

The digital input circuit 25 of the output means 12 may be able to perform a post-processing of the output digital data 5 thereby obtaining the m bits $O_1 \ldots O_m$ of output digital data 5.

Generally, the number n of bits of input data 4 can thus be seen as a number of bits that are simultaneously mixed by the digital-data mixing apparatus 2. The number n of bits of input data 4 may be of the order of a kilobyte, preferably of the order of a megabyte, preferably higher than a megabyte. The number m of bits of output data 5 may be of the order of a kilobyte, of the order of a megabyte, or higher than a megabyte. In some embodiments, the number m of bits of output data 5 can be lower than the number n of bits of input data 4.

Figure 4:
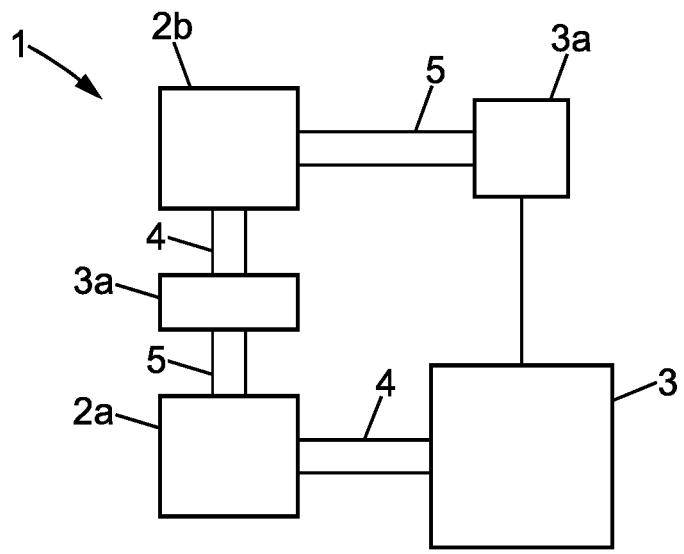
FIG. 4 is a block diagram of a digital-data processing system according to another embodiment of the invention.

FIG. 4 illustrates another embodiment of a digital-data processing system 1 according to the invention. In this embodiment, the digital-data processing system 1 comprises several digital-data mixing apparatuses chained together.

For instance, as illustrated on FIG. 4, a digital-data processing system 1 according to the second embodiment of the invention can comprise a first digital-data mixing apparatus 2a and a second digital-data mixing apparatus 2b. The first and the second digital-data mixing apparatus 2a, 2b are similar to the digital-data mixing apparatus described before and will not be detailed again.

The first digital-data mixing apparatus 2a and the second digital-data mixing apparatus 2b are connected together, directly or through interconnection electronic components 3a. In particular, the first and the second digital-data mixing apparatus 2a, 2b are connected so that the input digital data 4 of the second digital-data mixing apparatus 2b are function of the output digital data 5 provided by the first digital-data mixing apparatus 2a. The output digital data 5 provided by the first digital-data mixing apparatus 2a may be directly fed to the second digital-data mixing apparatus 2b or may be pre-processed, for instance by an electronic component 3 of the digital-data processing system 1.

Advantageously, in this embodiment of the digital-data processing system 1, at least one of the first digital-data mixing apparatus 2a and the second digital-data mixing apparatus 2b can be such that its electromagnetic scattering means 10 have non-negligible non-linear scattering effects on the modulated electromagnetic beam 15. This way, the digital-data mixing apparatuses chained together can perform processing of the digital data that are more complex than a simple linear combination of said digital data.

Alternatively or in addition, non-linear effects may be applied on the data by the interconnection electronic components 3a. Interconnection electronic components 3a may thus non-linearly process the output digital data from the first digital-data mixing apparatus 2a to obtain input digital data for the second digital-data mixing apparatus 2b.

In some embodiments of the invention, a procedure for qualifying the output of the digital-data processing system may be put in place. Such a procedure may be used for instance when the output of several digital-data processing systems are to be processed together.

Such a procedure may consists for instance in supplying a library of known signals as digital input data to a digital-data processing system and save the output digital data, obtained by processing said library of known signals by the digital-data processing system, in a database of output data. This database of output data constitutes a signature of the digital-data processing system. Stability and consistency of the digital-data processing system may be enabled by comparing said signatures at different points in time and/or across digital-data processing system.

Figure 5:
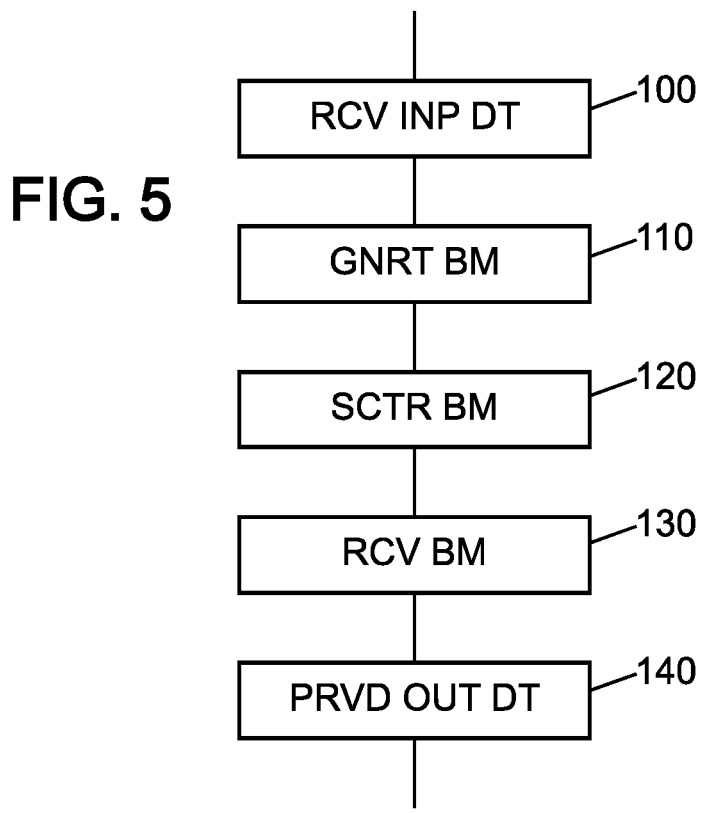
FIG. 5 is a flow chart of a method for mixing digital-data according to an embodiment of the invention.

As illustrated on FIG. 5, the invention is also related to a method for mixing digital-data with reference to the above description of the digital-data mixing apparatus 2 operations. Such a method can, in particular, be implemented by a digital-data mixing apparatus 2 and/or digital-data processing system 1.

In a general way, the method for mixing digital-data may comprise the steps of:

receiving 100 a plurality of at least n bits of input digital data, generating 110 a modulated electromagnetic beam wherein said n bits of input digital data are converted in n associated simultaneous modulations of the modulated electromagnetic beam, scattering 120 the modulated electromagnetic beam comprising said n simultaneous modulations, in a scattered electromagnetic beam, converting 130 said scattered electromagnetic beam in at least one bit of output digital data, providing 140 said at least one bit of output digital data.

The invention claimed is:

1. A method for generating, using an electronic component, an electromagnetic beam source, an electromagnetic beam modulator, a multiple scattering medium, and a receiver, random projections of a plurality of input digital-data blocks to a plurality of output digital data blocks, the method comprising:
   receiving, from the electronic component, the plurality of input digital data blocks, each input data block comprising at least n bits of input digital data;
   receiving, from the electromagnetic beam source, an electromagnetic beam;
   for each input digital data block,
      generating, by the electromagnetic beam modulator, a modulated electromagnetic beam by applying, at p transverse locations of a wavefront of the electromagnetic beam, p simultaneous modulations of at least one physical property of the electromagnetic beam, wherein the at least n bits of input digital data are converted into the p simultaneous modulations;
      scattering the modulated electromagnetic beam by multiple electromagnetic scattering through the multiple scattering medium to generate a scattered electromagnetic beam;
      converting the scattered electromagnetic beam into an output digital data block comprising at least m bits of output digital data by acquiring the at least m bits of output digital data at q distinct locations of a sensor area of the receiver that receives the scattered electromagnetic beam; and
      providing the at least m bits of output digital data.

2. The method according to claim 1, wherein the modulated electromagnetic beam is a beam of coherent electromagnetic radiation.

3. The method according to claim 1, wherein the at least one physical property is at least one of an amplitude, an intensity, a phase, and a polarization of the electromagnetic beam.

4. The method according to claim 1, wherein scattering the electromagnetic beam is performed by passive scattering medium.

5. The method according to claim 1, wherein scattering the electromagnetic beam comprises:
   receiving the modulated electromagnetic beam by an entry face of the multiple scattering medium;
   performing multiple electromagnetic scattering by a scattering body of the multiple scattering medium separating the entry face from an exit face of the multiple scattering medium; and
   transmitting the scattered electromagnetic beam by the exit face of the multiple scattering medium.

6. The method according to claim 1, wherein the number n of bits of the input data blocks is lower than the number m of bits of the output data blocks.

7. A computing device for generating random projections of a plurality of input digital-data blocks into a plurality of output digital data blocks,
   wherein the computing device comprises a digital-data mixing apparatus:
      a plurality of conductive terminals that receive from an electronic component the plurality of input digital-data blocks, each input digital-data block comprising at least n bits of input digital data;
      an electromagnetic beam source that generates an electromagnetic beam;
      an electromagnetic beam modulator that generates a electromagnetic beam by applying, at p transverse locations of a wavefront of the electromagnetic beam, p simultaneous modulations of at least one physical property of the electromagnetic beam, wherein the at least n bits of input digital data are converted into p simultaneous modulations;
      a multiple scattering medium that scatters the modulated electromagnetic beam by multiple electromagnetic scattering through the multiple scattering medium to generate a scattered electromagnetic beam;
      a receiver that converts the scattered electromagnetic beam into an output digital data block, wherein the output digital data block has at least m bits of output digital data, wherein the at least m bits of output digital data are acquired at q distinct locations of a sensor area of the receiver; and
      a plurality of conductive terminals that provide to an electronic component the at least m bits of output digital data.

8. The computing device according to claim 7, wherein the modulated electromagnetic beam is a beam of coherent electromagnetic radiation.

9. The computing device according to claim 7, wherein the at least one physical property is at least one of an amplitude, an intensity, a phase, and a polarization of the electromagnetic beam.

10. The computing device according to claim 7, wherein the electromagnetic beam modulator is a spatial light modulator, wherein the spatial light modulator comprises micromirrors or liquid crystals, and wherein the electromagnetic beam source comprises a laser.

11. The computing device according to claim 7, wherein the electromagnetic scattering medium is a passive scattering medium.

12. The computing device according to claim 7, wherein the multiple scattering medium is a transmission scattering medium comprising an entry face that receives the modulated electromagnetic beam and an exit face that transmits the scattered electromagnetic beam, the entry face and exit face being separated by a scattering body that performs multiple electromagnetic scattering.

13. The computing device according to claim 7, wherein the multiple scattering medium remains still over a period of time of at least two minutes.

14. The computing device according to claim 7, wherein the receiver comprises an image sensor.

15. The computing device according to claim 7, wherein the number n of bits of the input data blocks is lower than the number m of bits of the output data blocks.

16. The computing device according to claim 7, comprising at least one separate electronic component that provides the input digital data to the at least one digital-data mixing apparatus, and receives the output digital data from the at least one digital-data mixing apparatus.

17. The computing device according to claim 7, wherein the computing device is connected to a computer configured to implement a digital data processing algorithm,
   wherein the computing device:
      receives from the computer the plurality of input digital-data blocks generated by the digital data processing algorithm;
      generates random projections of the plurality of input digital-data blocks into the plurality of output digital data blocks; and
      provides the output digital data blocks to the computer.

18. A method of implementing a digital data processing algorithm using an electronic component, an electromagnetic beam source, an electromagnetic beam modulator, a multiple scattering medium, and a receiver, wherein the digital data processing algorithm is in a group consisting of a statistical Machine Learning algorithm, a deep neural network based algorithm, an Extreme Learning Machine algorithm, a Randomized Numerical Linear Algebra algorithm and a Locally Sensitive Hashing algorithm the method comprising:

generating random projections of a plurality of input digital-data blocks into a plurality of output digital data blocks, wherein generating the random projections of a plurality of input digital-data blocks into a plurality of output digital data blocks comprises:

receiving, from the electronic component, the plurality of input digital data blocks, each input data block comprising at least n bits of input digital data;

receiving, from the electromagnetic beam source, an electromagnetic beam;

for each input digital data block, generating, by the electromagnetic beam modulator, a modulated electromagnetic beam by applying, at p transverse locations of a wavefront of the electromagnetic beam, p simultaneous modulations of at least one physical property of the electromagnetic beam, wherein the at least n bits of input digital data are converted into the p simultaneous modulations;

scattering the modulated electromagnetic beam by multiple electromagnetic scattering through the multiple scattering medium to generate a scattered electromagnetic beam;

converting the scattered electromagnetic beam into an output digital data block comprising at least m bits of output digital data by acquiring the at least m bits of output digital data at q distinct locations of a sensor area of the receiver that receives the scattered electromagnetic beam; and providing the at least m bits of output digital data.

19. A digital-data processing system comprising:

a computer configured to implement a digital data processing algorithm; and a computing device connected to the computer, wherein the computing device:

receives from the computer a plurality of input digital-data blocks generated by the digital data processing algorithm;

generates random projections of the plurality of input digital-data blocks into a plurality of output digital data blocks; and provides the output digital data blocks to the computer;

wherein computing device comprises a digital-data mixing apparatus comprising:

a plurality of conductive terminals that receive from the computer the plurality of input digital-data blocks, each input digital data block comprising at least n bits of input digital data;

an electromagnetic beam source that generate an electromagnetic beam;

an electromagnetic beam modulator that generates a modulated electromagnetic beam by applying, at p transverse locations of a wavefront of the electromagnetic beam, p simultaneous modulations of at least one physical property of the electromagnetic beam, wherein the at least n bits of input digital data are converted into the p simultaneous modulations;

a multiple scattering medium that scatters the modulated electromagnetic beam, by multiple electromagnetic scattering through the multiple scattering medium to generate a scattered electromagnetic beam;

a receiver that converts the scattered electromagnetic beam into an output digital data block, wherein the output digital data block has at least m bits of output digital data, wherein the at least m bits of output digital data are acquired at q distinct locations of a sensor area of the receiver; and a plurality of conductive terminals that provide to an electronic component the at least m bits of output digital data; and wherein the digital data processing algorithm is in a group consisting of a statistical Machine Learning algorithm, a deep neural network based algorithm, an Extreme Learning Machine algorithm, a Randomized Numerical Linear Algebra algorithm, and a Locally Sensitive Hashing algorithm.

20. A digital-data processing system for generating random projections of a plurality of input digital-data blocks into a plurality of output digital data blocks, the digital-data processing system comprising:

a first digital-data mixing apparatus; and a second digital-data mixing apparatus, wherein the first digital-data mixing apparatus and the second digital-data mixing apparatus are connected together, directly or through interconnection electronic components;

wherein the first digital-data mixing apparatus comprises:

first input conductive terminals that receive the plurality of input digital-data blocks, each input digital data block comprising at least n1 bits of input digital data;

a first electromagnetic beam source that generates a first electromagnetic beam;

a first electromagnetic beam modulator that generates a first modulated electromagnetic beam by applying, at p1 transverse locations of a wavefront of the first electromagnetic beam, p1 simultaneous modulations of at least one physical property of the first electromagnetic beam, wherein the at least n1 bits of input digital data are converted into the p1 simultaneous modulations;

a first multiple scattering medium that scatters the first modulated electromagnetic beam, by multiple electromagnetic scattering through the first multiple scattering medium to generate a first scattered electromagnetic beam;

a first receiver that converts the first scattered electromagnetic beam into a first output digital data block comprising at least m1 bits of output digital data, wherein the at least m1 bits of output digital data are acquired at q1 distinct locations of a sensor area of the first receiver; and first output conductive terminals that provide the at least m1 bits of output digital data; and wherein the second digital-data mixing apparatus comprises:

second input conductive terminals that receive the at least m1 bits of output digital data;

a second electromagnetic beam source that generates a second electromagnetic beam;

a second electromagnetic beam modulator that generates a second electromagnetic beam by applying, at p2 transverse locations of a wavefront of the second electromagnetic beam, p2 simultaneous modulations of at least one physical property of the second electromagnetic beam, wherein the at least m1 bits of output digital data are converted into the p2 simultaneous modulations;

a second multiple scattering medium that scatters the second modulated electromagnetic beam, by multiple electromagnetic scattering through the second multiple scattering medium to generate a second scattered electromagnetic beam;

a second receiver that converts the second scattered electromagnetic beam into a second output digital data block comprising at least m2 bits of output digital data, wherein the at least m2 bits of output digital data are acquired at q2 distinct locations of a sensor area of the second receiver; and second output conductive terminals that provide the at least m2 bits of output digital data.

* * * * *